(12) United States Patent  
Jung et al.

(10) Patent No.: US 7,452,414 B1  
(45) Date of Patent: Nov. 18, 2008

(54) INK COMPOSITION, INK SET INCLUDING THE COMPOSITION, CARTRIDGE INCLUDING THE INK SET, AND INKJET RECORDING APPARATUS INCLUDING THE CARTRIDGE

(75) Inventors: Jae-yoon Jung, Suwon-si (KR); Jong-in Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/073,203

(22) Filed: Mar. 3, 2008

(30) Foreign Application Priority Data

Aug. 3, 2007 (KR) .................... 10-2007-0078183

(51) Int. Cl.
*C09D 11/00* (2006.01)
*C09D 11/02* (2006.01)
*B41J 2/01* (2006.01)

(52) U.S. Cl. .............. 106/31.46; 106/31.47; 106/31.49; 106/31.76; 106/31.77; 106/31.78; 347/100

(58) Field of Classification Search .............. 106/31.46, 106/31.47, 31.49, 31.76, 31.77, 31.78; 347/100
See application file for complete search history.

(56) References Cited

U.S. PATENT DOCUMENTS

| 4,012,334 | A | * | 3/1977 | Raleigh et al. | ............... 516/119 |
| 5,486,549 | A | * | 1/1996 | Itagaki et al. | ............ 106/31.58 |
| 5,877,235 | A | * | 3/1999 | Sakuma et al. | ........... 106/31.58 |
| 6,113,680 | A | * | 9/2000 | Aoyama et al. | .......... 106/31.86 |
| 6,858,663 | B2 | * | 2/2005 | Knott et al. | .................. 524/266 |
| 2006/0194707 | A1 | * | 8/2006 | Lu | ............................. 510/245 |
| 2006/0219133 | A1 | * | 10/2006 | Sakamoto et al. | ......... 106/31.65 |
| 2008/0202378 | A1 | * | 8/2008 | Kim et al. | ................. 106/31.13 |

\* cited by examiner

*Primary Examiner*—Helene Klemanski
(74) *Attorney, Agent, or Firm*—Roylance, Abrams, Berdo & Goodman, L.L.P.

(57) ABSTRACT

An ink composition is provided including a cyclic silazane-based compound, a colorant, and a solvent. The cyclic silazane-based compound in the ink composition prevents the production of ink foam or bubbles in a cartridge when an inkjet printer is operated, induces the rapid elimination of foam or bubbles produced, and exhibits a stable initial ink ejection behavior owing to good ink flowability and good long-term storage stability.

15 Claims, 2 Drawing Sheets

US 7,452,414 B1

INK COMPOSITION, INK SET INCLUDING THE COMPOSITION, CARTRIDGE INCLUDING THE INK SET, AND INKJET RECORDING APPARATUS INCLUDING THE CARTRIDGE

CROSS-REFERENCE TO RELATED PATENT APPLICATION

This application claims priority under 35 U.S.C. § 119(a) from Korean Patent Application No. 10-2007-0078183, filed on Aug. 3, 2007, in the Korean Intellectual Property Office, the disclosure of which is hereby incorporated by reference in its entirety.

BACKGROUND OF THE INVENTION

1. Field of the Invention

The present general inventive concept relates to an ink composition including a cyclic silazane-based compound, a colorant, and a solvent. More particularly, the invention relates to an ink composition containing a cyclic silazane-based compound to prevent the formation of ink foam or bubbles in a cartridge when an inkjet printer is operated. The cyclic silazane-based compound induces the rapid elimination of foam or bubbles when produced. The ink composition exhibits a stable initial ink ejection behavior owing to good ink flowability and good long-term storage stability.

2. Description of the Related Art

Recently, with an increase in need/demand for coloration of hard copies in the field of image processing, etc., various methods of producing color hard copies have been developed. Examples of these methods include dye-sublimation recording, thermal wax transfer recording, inkjet recording, electrophotographic recording, and thermally processed silver recording.

In inkjet printing, ink droplets are ejected from nozzles of a recording head of an inkjet printer onto a recording medium such as a paper. The ejected droplets form points called "dots" to create characters and images. The advantages of inkjet printing over other printing methods are its low cost, high quality, and ability to easily produce color images.

Thus, inkjet printers that are capable of simply printing at homes and offices have been widely been used. Inkjet printers that can provide image quality comparable to silver images have also been developed.

Ink used in inkjet printing is prepared by dissolving or dispersing a water-soluble dye or pigment into a solvent including water and a water-soluble organic solvent. If necessary, an additive such as a surfactant may be added.

In order to accomplish good inkjet recording for a long time, water-based ink for inkjet printing must satisfy the following requirements: characteristics such as viscosity, surface tension, and density should have appropriate values, nozzle clogging in an inkjet recording apparatus, precipitate formation due to heat or the like, and a change in physical property values should not occur, and recorded images should have excellent water-repellency and light fastness.

When a large amount of ink is stored in a large capacity ink reservoir used in an inkjet system for a long time, foam or bubbles may be produced in the ink. Furthermore, when air is dissolved in ink, the ink may produce foam or bubbles. In addition, when an ink circulation system is incorporated in a print cartridge, foam or bubbles may form in the print cartridge. The foam or bubbles must be easily removed from the ink or be prevented from being produced. Thus, it is necessary to enhance the defoaming or antifoaming property of ink.

However, in conventional ink compositions, foam or bubbles are easily produced due to the surfactant used as a component of the ink, and thus, the requirements of an ink composition are not satisfied.

In view of this problem, Japanese Patent No. 3,078,184 discloses addition of a fluorine- or silicon-based polymer to the ink.

However, such a polymer is poorly soluble in the ink, and thus, it is necessary to use a solvent that can disperse or dissolve the polymer. Moreover, such a solvent and polymer have poor miscibility with standard water-soluble additives forming the ink. Thus, layer separation and solidification easily occur in the ink, and when the ink is not used for a long time, the silicon polymer and the ink are rapidly dried, thereby rapidly increasing the viscosity of the ink, resulting in nozzle clogging due to ink hardened at a surface of a nozzle of a printhead.

Recent related technology has not yet provided an ink composition capable of preventing the production of ink foam or bubbles in a cartridge, rapidly eliminating foam or bubbles produced, and exhibiting a stable initial ejection behavior and good long-term storage stability.

SUMMARY OF THE INVENTION

The present general inventive concept provides an ink composition which prevents the production of ink foam or bubbles in a cartridge when an inkjet printer is operated, induces the rapid elimination of foam or bubbles produced, and exhibits a stable initial ink ejection behavior owing to good ink flowability and good long-term storage stability.

The present general inventive concept also provides an ink set including two or more kinds or colors of the ink composition.

The present general inventive concept also provides a cartridge for an inkjet recording apparatus, including the ink set.

The present general inventive concept also provides an inkjet recording apparatus including the cartridge.

According to an aspect of the present general inventive concept, an ink composition is provided where the ink includes:

a cyclic silazane-based compound represented by Formula 1 below;

a colorant; and a solvent:

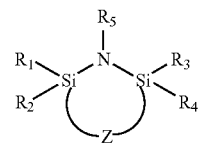

Formula 1 wherein, $R_1$ through $R_5$ are each independently hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ heteroalkoxy group, a substituted or unsubstituted $C_1$-$C_{20}$ alkylsulfonamide group, a substituted or unsubstituted $C_6$-$C_{20}$ arylsulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a carboxyl group or its salt, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroaryloxy group, a substituted or unsubstituted $C_6$-$C_{20}$ heteroarylalkenyl group, a substituted or unsubstituted $C_3$-$C_{20}$ cycloalkyl group, or a substituted or unsubstituted $C_3$-$C_{20}$ heterocycloalkyl group; and Z includes a —$(CH_2)_m$— group where m is an integer ranging from 1 to 10, and at least one of the methylene group is oxygen, sulfur,

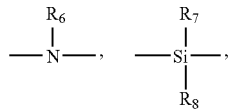

a substituted or unsubstituted $C_1$-$C_{10}$ alkylene group, a substituted or unsubstituted $C_1$-$C_{10}$ heteroalkylene group having 1-9 heteroatoms, or a substituted or unsubstituted $C_1$-$C_{10}$ alkenylene group where $R_6$, $R_7$, and $R_8$ are each independently hydrogen, a substituted or unsubstituted $C_1$-$C_{20}$ alkyl group, or a substituted or unsubstituted $C_2$-$C_{20}$ alkenyl group.

According to another aspect of the present general inventive concept, an ink set is provided including two or more kinds or colors of the ink composition.

According to another aspect of the present general inventive concept, a cartridge is provided for an inkjet recording apparatus, including the ink set.

According to another aspect of the present general inventive concept, an inkjet recording apparatus is provided including the cartridge.

According to the present general inventive concept, a cyclic silazane-based compound is used in the ink composition to prevent the production of ink foam or bubbles in a cartridge when an inkjet printer is operated, to induce the rapid elimination of foam or bubbles produced, and to provide an ink composition that exhibits a stable initial ink ejection behavior owing to good ink flowability and good long-term storage stability.

These and other aspects of the invention will become apparent from the following detailed description of the invention which discloses various embodiments of the invention.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE INVENTION

Figure 1:
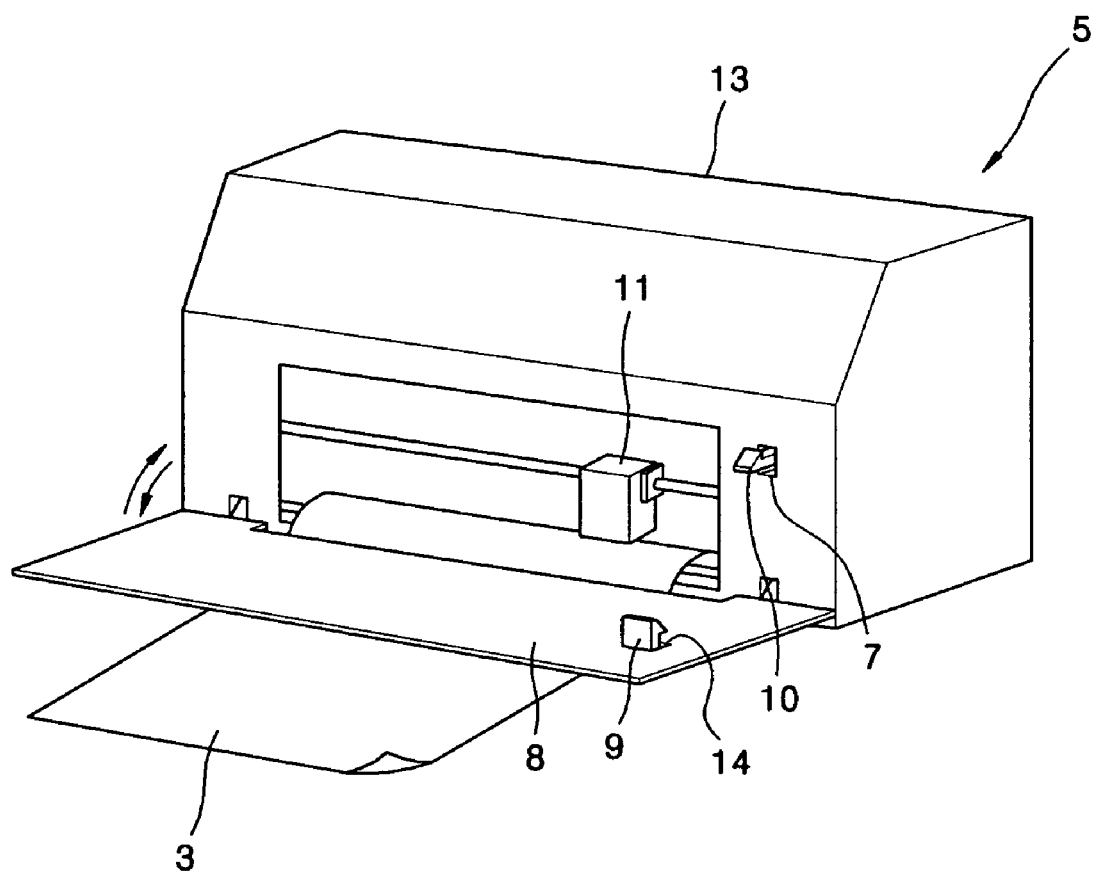
FIG. 1 is a perspective view illustrating an inkjet recording apparatus including an ink cartridge according to an embodiment of the present general inventive concept.

Hereinafter, the present general inventive concept will be described in more detail.

The present general inventive concept provides an ink composition including a cyclic silazane-based compound represented by Formula 1 below; a colorant; and a solvent:

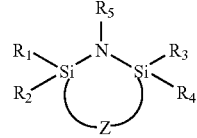

Formula 1 wherein, $R_1$ through $R_5$ are each independently hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ heteroalkoxy group, a substituted or unsubstituted $C_1$-$C_{20}$ alkylsulfonamide group, a substituted or unsubstituted $C_6$-$C_{20}$ arylsulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a carboxyl group or its salt, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroaryloxy group, a substituted or unsubstituted $C_6$-$C_{20}$ heteroarylalkenyl group, a substituted or unsubstituted $C_3$-$C_{20}$ cycloalkyl group, or a substituted or unsubstituted $C_3$-$C_{20}$ heterocycloalkyl group; and Z includes a —$(CH_2)_m$— group where m is an integer ranging from 1 to 10, and at least one of the methylene group is oxygen, sulfur,

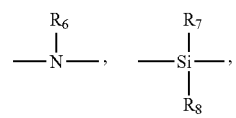

a substituted or unsubstituted $C_1$-$C_{10}$ alkylene group, a substituted or unsubstituted $C_1$-$C_{10}$ heteroalkylene group having 1-9 heteroatoms, or a substituted or unsubstituted $C_1$-$C_{10}$ alkenylene group where $R_6$, $R_7$, and $R_8$ are each independently hydrogen, a substituted or unsubstituted $C_1$-$C_{20}$ alkyl group, or a substituted or unsubstituted $C_2$-$C_{20}$ alkenyl group.

In one embodiment of the invention, the cyclic silazane-based compound has the Formula 1 where $R_1$, $R_2$, $R_3$ and $R_4$ are independently a lower alkyl or lower alkylenyl, $R_5$ is H and Z is —$C_2H_4$—, —NH—Si$(CH_3)_2$—NH— or —$NH^2$—Si$(CH_3)_2$—NH—Si$(CH_3)_2$—NH—.

The compounds of Formula 1 can be produced according to conventional synthetic reaction schemes and methods as known by one skilled in the art. Certain compounds of Formula 1 are available from various commercial sources.

According to the ink composition including the cyclic silazane-based compound of Formula 1 of the present general inventive concept, an antifoaming/defoaming effect can be enhanced due to the antifoaming/defoaming action of the silane atoms, foaming can be reduced in the ink composition, and any foam that is produced can be rapidly eliminated.

The cyclic silazane-based compound of Formula 1 that can be used in the ink composition of the present general inventive concept may be, for example, 2,2,4,4,6,6-hexamethyl-1,3,5,2,4,6-triazatrisilinane represented by Formula 2 below, 2,2,4,4,6,6,8,8-octamethyl-1,3,5,7,2,4,6,8-tetrazatetrasilocane represented by Formula 3 below, 1-(3-bromopropyl)-2,2,5,5-tetramethyl-1,2,5-azadisilolidine represented by Formula 4 below, 2,2,5,5-tetramethyl-1,2,5-azadisilolidine represented by Formula 5 below, 2,4,6-trimethyl-2,4,6-trivinyl-1,3,5,2,4,6-triazatrisilinane represented by Formula 6 below, 2,4,6,8-tetramethyl-2,4,6,8-tetravinyl-1,3,5,7,2,4,6,8-tetrazatetrasilocane represented by Formula 7 below, or a mixture thereof, but is not limited thereto:

Formula 2
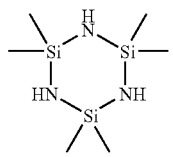

Formula 3
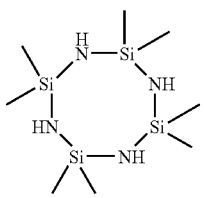

Formula 4
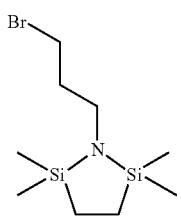

Formula 5
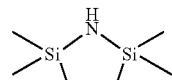

Formula 6
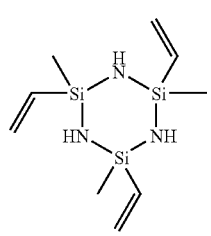

Formula 7
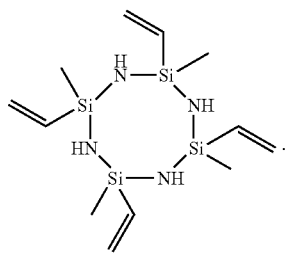

In the ink composition of the present general inventive concept, the content of the cyclic silazane-based compound of Formula 1 is about 0.01 to 10 parts by weight, preferably about 0.1 to 5 parts by weight, more preferably about 0.1 to 3 parts by weight, based on 100 parts by weight of the ink composition.

If the content of the cyclic silazane-based compound of Formula 1 is less than 0.01 parts by weight, the antifoaming/defoaming effect of inkjet ink may be insufficient, and the performance of initial introduction of the ink into an ink channel may be unsatisfactory. On the other hand, if the content of the cyclic silazane-based compound of Formula 1 exceeds 10 parts by weight, the degree of penetration of the ink into a recording paper may be too high so that the ink blotches the back side of the recording paper, ink bleeding may occur, and an abnormal phenomenon such as extreme ink wetting around a nozzle may occur, thereby rendering stable ejection of the ink difficult.

Both a dye and a pigment can be used as the colorant of the ink composition according to the present general inventive concept. The colorant can be any suitable colorant as known in the art. For example, the colorant may be selected from direct dyes, acid dyes, foodstuff dyes, basic dyes, reactive dyes, disperse dyes, oil dyes, self-dispersible pigments, capsulated pigments, and mixtures thereof.

Examples of dyes that can be used as the colorant include, but are not limited to, food black dyes, food red dyes, food yellow dyes, food blue dyes, acid black dyes, acid red dyes, acid blue dyes, acid yellow dyes, direct black dyes, direct blue dyes, direct yellow dyes, anthraquinone dyes, monoazo dyes, diazo dyes, and phthalocyanine derivatives, and examples of pigments that can be used as the colorant include, but are not limited to, carbon black, graphite, vitreous carbon, activated charcoal, activated carbon, anthraquinone, phthalocyanine blue, phthalocyanine green, diazos, monoazos, pyranthrones, perylene, quinacridone, and indigoid pigments. The self-dispersible pigment may be cabojet-series or CW-series (Orient Chemical), but is not limited thereto.

The colorant may be used in an amount of about 0.5 to 10 parts by weight, preferably about 1 to 7 parts by weight, more preferably about 3 to 5 parts by weight, based on 100 parts by weight of the ink composition. If the content of the colorant is less than 0.5 parts by weight, sufficient coloration may not be achieved. On the other hand, if the content of the colorant exceeds 10 parts by weight, the solubility of the colorant may be lowered.

The solvent used in the ink composition according to the present general inventive concept may be an aqueous solvent such as water. The aqueous solvent may be used in combination with at least one organic solvent. The solvent may be used in an amount of about 80 to 99 parts by weight, preferably about 60 to 90 parts by weight, more preferably about 85 to 95 parts by weight, based on 100 parts by weight of the ink composition.

If the content of the solvent is less than 80 parts by weight, the viscosity of the ink composition may be excessively increased, thereby lowering the performance of ink ejection. On the other hand, if the content of the solvent exceeds 99 parts by weight, the surface tension of ink may be increased, thereby lowering the performance of ink ejection.

The organic solvent used herein may be at least one selected from the group consisting of monohydric alcohol-based solvents, ketone-based solvents, ester-based solvents, polyhydric alcohol-based solvents, nitrogen-containing solvents, and sulfur-containing compounds (such as dimethyl sulfoxide, tetramethylsulfone, or thioglycol).

The monohydric alcohol-based solvents that can be used as the organic solvent may be methyl alcohol, ethyl alcohol, n-propyl alcohol, isopropyl alcohol, n-butyl alcohol, sec-butyl alcohol, t-butyl alcohol, or isobutyl alcohol, the ketone-based solvents may be acetone, methylethylketone, diethylketone, or diacetone alcohol, the ester-based solvents may be methyl acetate, ethyl acetate, or ethyl lactate, and the polyhydric alcohol-based solvents may be ethyleneglycol, diethyleneglycol, triethyleneglycol, propyleneglycol, butyleneglycol, 1,4-butanediol, 1,2,4-butanetriol, 1,5-pentanediol, 1,2,6-hexanetriol, hexyleneglycol, glycerol, glycerol ethoxylate, or trimethylolpropane ethoxylate. The monohydric alcohol-based solvents that can be used as the organic solvent can adjust the surface tension of ink, thereby enhancing ink permeability, dot formability, and dry characteristics of printed images on a recording medium, such as a general paper or a special paper. The polyhydric alcohol-based or its derivative solvents are not easily evaporated and lower the freezing point of the ink, thereby enhancing the storage stability of the ink, resulting in prevention of nozzle clogging.

The nitrogen-containing solvents that can be used as the organic solvent may be 2-pyrrolidone or N-methyl-2-pyrrolidone, and the sulfur-containing solvents that can be used as the organic solvent may be dimethyl sulfoxide, tetramethylenesulfone, or thioglycol.

When the organic solvent is used in combination with the aqueous solvent such as water, the content of the organic solvent may be about 0.1 to 130 parts by weight, preferably about 10 to 50 parts by weight, based on 100 parts by weight of water. If the content of the organic solvent is less than 0.1 parts by weight, the surface tension of ink may be excessively increased. On the other hand, if the content of the organic solvent exceeds 130 parts by weight, the viscosity of ink may be increased, thereby lowering the performance of ink ejection.

The ink composition according to the present general inventive concept may include various additives in order to reinforce the characteristics of the ink composition. Specifically, the ink composition may further include at least one additive selected from the group consisting of a wetting agent, a dispersant, a surfactant, a viscosity modifier, a pH adjustor, and an antioxidant. The content of the additive may be about 0.5 to 600 parts by weight, preferably about 10 to 300 parts by weight, based on 100 parts by weight of the colorant. If the content of the additive is less than 0.5 parts by weight, it may be difficult to realize the performance of ink. On the other hand, if the content of the additive exceeds 600 parts by weight, the storage stability of ink may be lowered.

In particular, the surfactant used as the additive is not particularly limited and can be appropriately selected according to the intended use. For example, the surfactant may be an amphoteric surfactant, an anionic surfactant, a cationic surfactant, a nonionic surfactant, and the like. These surfactants may be used alone or in combination of two or more.

The amphoteric surfactant may be alanine, dodecyldi(aminoethyl)glycine, di(octylaminoethyl)glycine, N-alkyl-N,N-dimethylammoniumbetaine, and the like.

The anionic surfactant may be alkylbenzenesulfonate, α-olefinsulfonate, polyoxyethylenealkyletheracetate, phosphate ester, and the like.

The cationic surfactant may be an amine salt surfactant such as an alkylamine salt, an amino alcohol fatty acid derivative, a polyamine fatty acid derivative, or imidazoline; a quaternary ammonium salt surfactant such as an alkyltrimethylammonium salt, a dialkyldimethylammonium salt, an alkyldimethylbenzylammonium salt, a pyridinium salt, an alkylisoquinolinum salt, or a chlorinated benzetonium salt.

The nonionic surfactant may be a polyoxyethylene alkylether surfactant, a polyoxyethylene alkylphenylether surfactant, an acetyleneglycol surfactant, and the like.

The nonionic surfactant is preferred owing to its good antifoaming/defoaming property.

Preferably, the nonionic surfactant may be SURFYNOL series (Air Products) having an acetylenic ethoxylated diol structure, TERGITOL series (Union Carbide) having a polyethylene oxide or polypropylene oxide structure, Tween series having a polyoxyethylene sorbitan fatty acid ester structure, and the like.

The ink composition according to the present general inventive concept may have a surface tension of about 15 to 70 dyne/cm, preferably about 25 to 55 dyne/cm, at 20° C., and a viscosity of 1 to 20 cps, preferably 1.5 to 3.5 cps, at 20° C., in order to guarantee an optimal use of the ink composition. If the surface tension of the ink composition is outside the above range, the performance of printing may be lowered. If the viscosity of the ink composition is outside the above range, the ejection of ink may not be efficiently performed.

The present general inventive concept also provides an ink set including two or more different ink compositions according to the present general inventive concept. The ink set can be provided in an ink receiver or an inkjet printer cartridge of an inkjet recording apparatus. An inkjet recording apparatus according to the present general inventive concept may include a thermal head ejecting ink droplets using vapor pressure generated by heating an ink composition, a piezo head ejecting ink droplets using a piezo device, a disposable head, or a permanent head. The inkjet recording apparatus may be a scanning type printer or an array type printer. The inkjet recording apparatus can be used for desktop, textile, and industrial purpose. The types of heads and the types and applications of printers related to the inkjet recording apparatus according to the present general inventive concept are intended to only explain the inkjet recording apparatus of the present general inventive concept. An inkjet recording apparatus to which an ink composition according to the present general inventive concept can be applied is not limited to the above-described inkjet recording apparatus and can be selected from various inkjet recording apparatuses.

Substituents used in compounds according to the present general inventive concept can be defined as follows.

The term "alkyl group" used herein refers to a straight or branched, saturated monovalent hydrocarbon moiety having 1-20, preferably 1-10, more preferably 1-6 carbon atoms. Examples of an unsubstituted alkyl group used herein include methyl, ethyl, propyl, isobutyl, sec-butyl, tert-butyl, pentyl, iso-amyl, hexyl, etc. At least one hydrogen atom of the alkyl group may be substituted by a halogen atom, a hydroxyl group, a nitro group, a cyano group, a substituted or unsubstituted amino group ($-NH_2$, $-NH(R)$, or $-N(R')(R'')$ where $R'$ and $R''$ are each independently a $C_1$-$C_{10}$ alkyl group), an amidino group, hydrazine, hydrazone, a carboxyl group, a sulfonic acid group, a phosphoric acid group, a $C_1$-$C_{20}$ alkyl group, a halogenated $C_1$-$C_{20}$ alkyl group, a $C_1$-$C_{20}$ alkenyl group, a $C_1$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

The term "heteroalkyl group" used herein refers to an alkyl group as defined above in which at least one carbon atom, preferably 1-5 carbon atoms, in the main chain is substituted by a heteroatom, e.g., an oxygen atom, a sulfur atom, a nitrogen atom, or a phosphorus atom.

The term "alkenyl group" used herein refers to a straight or branched monovalent hydrocarbon moiety having 2-20, preferably 2-10, more preferably 2-6 carbon atoms including at least one carbon-carbon double bond. The alkenyl group may be optionally substituted by at least one halogen substituent. For example, the alkenyl group may be ethenyl, 1-propenyl, 2-propenyl, 2-butenyl, 3-butenyl, pentenyl, 5-hexenyl, dodecenyl, etc.

The term "aryl group" used herein refers to a monovalent monocyclic, bicyclic, or tricyclic aromatic hydrocarbon moiety having 6-30, preferably 6-18 ring atoms. The aryl group may be optionally substituted by at least one halogen substituent. The aromatic moiety of the aryl group consists of carbon atoms. For example, the aryl group may be phenyl, naphthalenyl, or fluorenyl. At least one hydrogen atom of the aryl group may be substituted by a substituent as recited in the alkyl group.

The term "heteroaryl group" used herein refers to a cyclic aromatic system having 5 to 30-membered ring(s) including one, two, or three heteroatoms selected from N, O, P, and S. Two or more rings may be attached to each other as a pendant group or fused rings. At least one hydrogen atom of the heteroaryl group may be substituted by a substituent as recited in the alkyl group.

The term "alkoxy group" used herein refers to a radical —O-alkyl, where the alkyl is as defined above. For example, the alkoxy group may be methoxy, ethoxy, propoxy, isobutyloxy, sec-butyloxy, pentyloxy, iso-amyloxy, hexyloxy, etc. At least one hydrogen atom of the alkoxy group may be substituted by a substituent as defined by the alkyl group as discussed above.

The term "heteroalkoxy group" used herein essentially refers to an alkoxy group as defined above except that at least one heteroatom, e.g., oxygen, sulfur, or nitrogen is present in an alkyl chain. For example, the heteroalkoxy group may be $CH_3CH_2OCH_2CH_2O-$, $C_4H_9OCH_2CH_2OCH_2CH_2O-$, $CH_3-O-(CH_2CH_2O)_nH$, or the like.

The term "arylalkyl group" used herein refers to an aryl group as defined above in which at least one hydrogen atom is substituted by a lower alkyl radical, e.g., methyl, ethyl, or propyl. For example, the arylalkyl group may be benzyl, phenylethyl, or the like. At least one hydrogen atom of the arylalkyl group may be substituted by a substituent as recited in the alkyl group.

The term "heteroarylalkyl group" used herein refers to a heteroaryl group in which at least one hydrogen atom is substituted by a lower alkyl group. The "heteroaryl" in the heteroarylalkyl group is as defined above. At least one hydrogen atom of the heteroarylalkyl group may be substituted by a substituent as recited in the alkyl group.

The term "aryloxy group" used herein refers to a radical —O-aryl. Here, the aryl is as defined above. For example, the aryloxy group may be phenoxy, naphthyloxy, anthracenyloxy, phenanthrenyloxy, fluorenyloxy, indenyloxy, or the like.

At least one hydrogen atom of the aryloxy group may be substituted by a substituent as recited in the alkyl group.

The term "heteroaryloxy group" used herein refers to a radical —O-heteroaryl. Here, the heteroaryl is as defined above. For example, the heteroaryloxy group may be benzyloxy, phenylethyloxy, or the like. At least one hydrogen atom of the heteroaryloxy group may be substituted by a substituent as recited in the alkyl group.

The term "cycloalkyl group" used herein refers to a monovalent monocyclic system having 5-30 carbon atoms. At least one hydrogen atom of the cycloalkyl group may be substituted by a substituent as recited in the alkyl group.

The term "heterocycloalkyl group" used herein refers to a monovalent monocyclic system having 5 to 30-membered ring(s) including one, two, or three heteroatoms selected from N, O, P, and S. At least one hydrogen atom of the heterocycloalkyl group may be substituted by a substituent as recited in the alkyl group.

FIG. 1 is a view illustrating an inkjet recording apparatus according to an embodiment of the present general inventive concept.

Referring to FIG. 1, the inkjet recording apparatus includes an inkjet printer cartridge 11 including an ink composition containing a macro-chromophore-containing colorant and a colorant-like additive. A printer cover 8 is connected to a main body 13 of a printer 5. A latching portion of a movable latch 10 is projected outward from a hole 7, and the movable latch 10 is engaged with a fixed latch 9. When the printer cover 8 is covered, the fixed latch 9 is connected to an inner portion of the main body 13. The printer cover 8 has a recess 14 corresponding to the latching portion of the movable latch 10 extending through the hole 7. The inkjet printer cartridge 11 is installed such that ink is ejected onto a paper 3 that passes through a lower portion of the inkjet printer cartridge 11.

Figure 2:
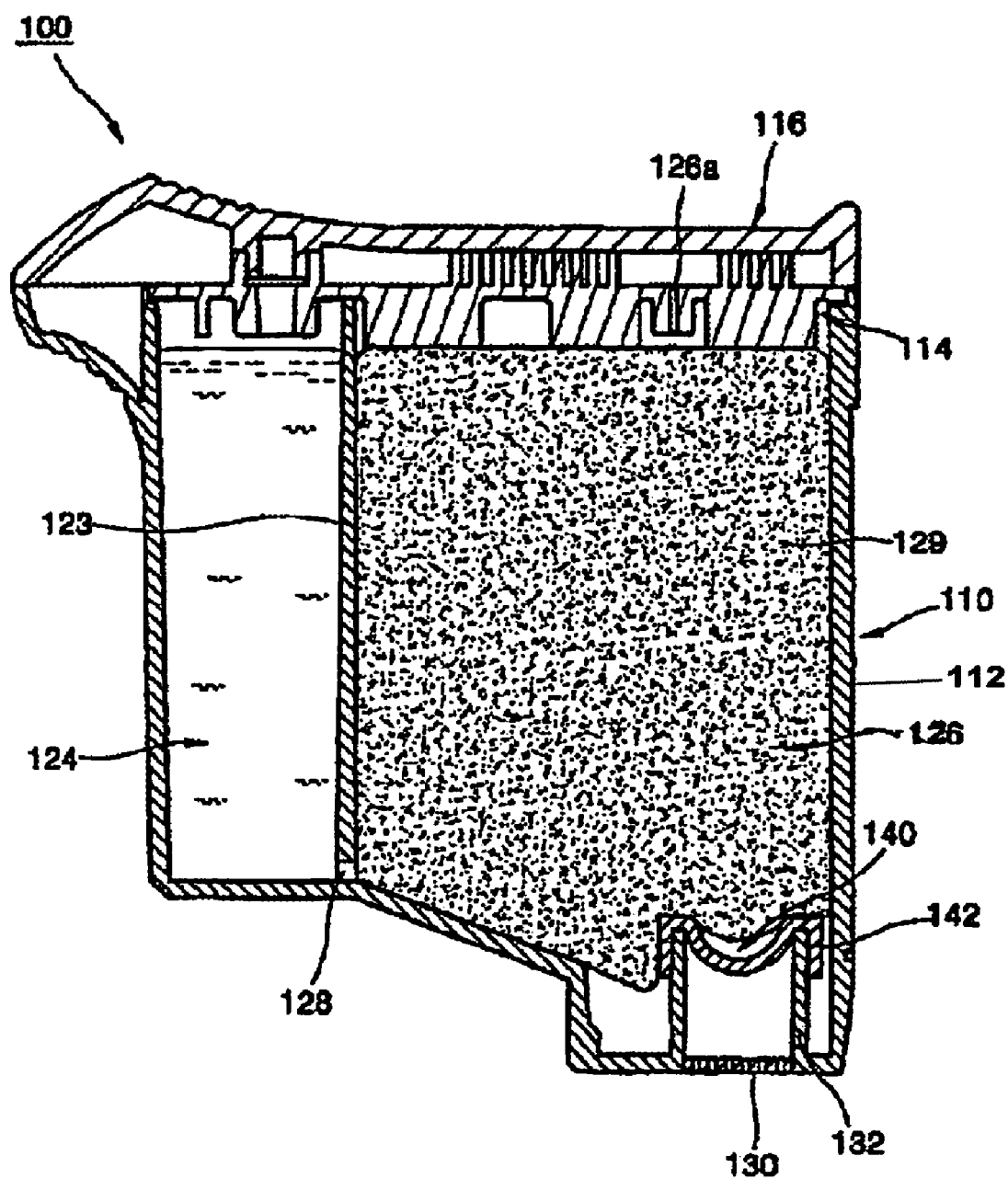
FIG. 2 is a sectional view illustrating an ink cartridge according to an embodiment of the present general inventive concept.

FIG. 2 is a sectional view illustrating an inkjet printer cartridge 100 including an ink set according to an embodiment of the present general inventive concept. Referring to FIG. 2, the inkjet printer cartridge 100 includes a cartridge main body 110 defining an ink reservoir 112, an inner cover 114 covering a top portion of the ink reservoir 112, and an outer cover 116 which is separated from the inner cover 114 by a predetermined distance and which seals the ink reservoir 112 and the inner cover 114.

The ink reservoir 112 is divided into a first chamber 124 and a second chamber 126 by a vertical barrier wall 123. An ink passage 128 is formed at a bottom of the vertical barrier wall 123 between the first chamber 124 and the second chamber 126. Ink is filled in the first chamber 124 and in a sponge 129, and then in the second chamber 126. A vent hole 126a is formed at the inner cover 114 corresponding to the second chamber 126.

A filter 140 is disposed at a bottom side of the second chamber 126 and filters impurities and fine bubbles in ink so as to prevent clogging of an ejection hole of a printhead 130. A hook 142 formed at an edge of the filter 140 is disposed (coupled) at a top portion of a standpipe 132. Ink of the ink reservoir 112 is ejected in the form of fine droplets onto a print medium via the ejection hole of the printhead 130.

Hereinafter, the present general inventive concept will be described more specifically with reference to the following examples. The following examples are only for illustrative purposes and are not intended to limit the scope of the present general inventive concept.

—Preparation of Ink Compositions—

Cyclic silazane-based compounds, colorants, water, organic solvents, and additives were mixed according to the following composition ratios, and the reaction mixtures were sufficiently stirred in stirrers for 30 minutes or more to prepare uniform solutions. The uniform solutions were filtered with filters having a pore size of 0.45 μm to obtain ink compositions of Examples 1-4.

EXAMPLE 1

| | |
|---|---|
| Carbon black (FW18, Degussa Co.) | 5 parts by weight |
| Glycerol | 2 parts by weight |
| Diethyleneglycol | 3 parts by weight |
| Compound of Formula 2 | 3 parts by weight |
| Water (deionized water) | 87 parts by weight |
| Nonionic surfactant (Tween 40, Aldrich) | 0.6 parts by weight |

EXAMPLE 2

| | |
|---|---|
| Carbon black (Raven 5250, Columbian Co.) | 5 parts by weight |
| Glycerol | 3 parts by weight |
| Diethyleneglycol | 2 parts by weight |
| Ethyleneglycol | 2 parts by weight |
| Compound of Formula 3 | 3 parts by weight |
| Water (deionized water) | 85 parts by weight |
| Nonionic surfactant (Tween 40, Aldrich) | 0.6 parts by weight |

EXAMPLE 3

| | |
|---|---|
| Carbon black (Regal 330, Cabot Co.) | 5 parts by weight |
| Diethyleneglycol | 3 parts by weight |
| Ethyleneglycol | 4 parts by weight |
| Compound of Formula 4 | 3 parts by weight |
| Water (deionized water) | 85 parts by weight |
| Nonionic surfactant (Tween 40, Aldrich) | 0.6 parts by weight |

EXAMPLE 4

| | |
|---|---|
| Carbon black (Regal 330, Cabot Co.) | 5 parts by weight |
| Diethyleneglycol | 3 parts by weight |
| Ethyleneglycol | 4 parts by weight |
| Compound of Formula 5 | 3 parts by weight |
| Water (deionized water) | 85 parts by weight |
| Nonionic surfactant (Tween 40, Aldrich) | 0.6 parts by weight |

COMPARATIVE EXAMPLE 1

An ink composition was prepared under the same conditions as in Example 1 except that the compound of Formula 2 was not used.

COMPARATIVE EXAMPLE 2

An ink composition was prepared under the same conditions as in Example 2 except that the compound of Formula 3 was not used.

COMPARATIVE EXAMPLE 3

An ink composition was prepared under the same conditions as in Example 3 except that the compound of Formula 4 was not used.

COMPARATIVE EXAMPLE 4

An ink composition was prepared under the same conditions as in Example 4 except that the compound of Formula 5 was not used.

<Antifoaming/Defoaming Test>

The degree of foaming in ink composition was evaluated according to the Ross-Miles method.

In the Ross-Miles method, a lower part is filled with 50 ml of ink, and ink is dropwise added from a height of 1 m onto the ink of the lower part. The height of foam produced is measured 5 minutes after the dropwise addition. The height of form of the ink composition according to the present invention produced by the Ross-Miles method is less than 50 mm after 5 minutes.

For the ink compositions prepared in Examples 1-4 and Comparative Examples 1-4, the volume of foam produced was measured after ink droplets were dropped from a burette filled with 200 ml of ink onto 50 ml of ink in a mass cylinder. The evaluation was made by the following criteria and the results are presented in Table 1 below.

◯: 0 mm≦foam height≦50 mm
Δ: 50 mm<foam height≦100 mm
x: 100 mm<foam height

TABLE 1

| | Examples | | | | Comparative Examples | | | |
|---|---|---|---|---|---|---|---|---|
| Section | 1 | 2 | 3 | 4 | 1 | 2 | 3 | 4 |
| Evaluation | ◯ | ◯ | ◯ | ◯ | Δ | x | Δ | x |

Table 1 shows that ink including a cyclic silazane-based compound according to the present general inventive concept exhibits an excellent antifoaming/defoaming property.

<Ejection Stability Test>

The ink compositions prepared in Examples 1-4 and Comparative Examples 1-4 were loaded in Samsung ink cartridges at room temperature (25° C.) for two weeks. Then, the ink compositions were printed and the degree of ejection failure due to nozzle clogging was evaluated as follows. The results are presented in Table 2 below.

◯: the ratio of unclogged nozzles to the total number of nozzles after three nozzle cleaning cycles: 90% or more
Δ: the ratio of unclogged nozzles to the total number of nozzles after three nozzle cleaning cycles: 70% or more
x: the ratio of unclogged nozzles to the total number of nozzles after three nozzle cleaning cycles: less than 70%

TABLE 2

| | Examples | | | | Comparative Examples | | | |
|---|---|---|---|---|---|---|---|---|
| Section | 1 | 2 | 3 | 4 | 1 | 2 | 3 | 4 |
| Evaluation (room temperature) | ◯ | ◯ | ◯ | ◯ | ◯ | Δ | x | Δ |

Referring to Table 2, for the ink compositions prepared in Examples 1-4, the percentage of unclogged nozzles was 90% or more. This shows that ink including a cyclic silazane-based compound according to the present general inventive concept does not cause nozzle clogging, and thus, it has no trouble in storage stability.

<Long-Term Storage Stability Test—Evaluation of Layer Separation>

The ink compositions prepared in Examples 1-4 were loaded in glass vials, incubated at room temperature (25° C.) and high temperature (60° C.) and frozen at low temperature (−18° C.) (for 8 weeks each), and removed from the vials. Layer separation and precipitate formation were evaluated, and the results are presented in Table 3 below.

◯: no occurrence of layer separation and precipitate formation x: occurrence of layer separation and precipitate formation

TABLE 3

|  | Examples | | | |
| Section | 1 | 2 | 3 | 4 |
| --- | --- | --- | --- | --- |
| Evaluation (room temperature) | ◯ | ◯ | ◯ | ◯ |
| Evaluation (high temperature) | ◯ | ◯ | ◯ | ◯ |
| Evaluation (frozen) | ◯ | ◯ | ◯ | ◯ |

Referring to Table 3, the ink compositions prepared in Examples 1-4 did not exhibit layer separation and precipitate formation for long-term storage. This shows that ink including an antifoaming/defoaming agent according to the present general inventive concept exhibits good long-term storage.

Long-Term Storage Stability—Evaluation of Particle Size and Viscosity>

The ink compositions prepared in Examples 1-4 were loaded in Nalgen vials, incubated at room temperature (25° C.) and high temperature (60° C.) and frozen at −18° C. (for 8 weeks each), and then removed from the vials. The particle size of the colorants and the viscosity of the ink compositions were evaluated, and the results are presented in Table 4 below.

◯: an increase (%) in particle size and viscosity: less than 10%

Δ: an increase (%) in particle size and viscosity: 10% or more and less than 30% x: an increase (%) in particle size and viscosity: 30% or more

TABLE 4

|  | Examples | | | | | | | |
|  | Particle size | | | | Viscosity | | | |
| Section | 1 | 2 | 3 | 4 | 1 | 2 | 3 | 4 |
| --- | --- | --- | --- | --- | --- | --- | --- | --- |
| Evaluation (room temperature) | ◯ | ◯ | ◯ | ◯ | ◯ | ◯ | ◯ | ◯ |
| Evaluation (high temperature) | ◯ | ◯ | Δ | ◯ | ◯ | ◯ | Δ | ◯ |
| Evaluation (frozen) | ◯ | ◯ | ◯ | ◯ | ◯ | ◯ | ◯ | ◯ |

Referring to Table 4, the ink compositions prepared in Examples 1-4 did not exhibit an increase in particle size of the colorants and viscosity of the ink composition. This shows that ink including an antifoaming/defoaming agent according to the present general inventive concept exhibits good long-term storage.

An ink composition according to the present general inventive concept includes a cyclic silazane-based compound. Thus, the ink composition can prevent the production of ink foam in a cartridge when an inkjet printer is operated, induce the rapid elimination of foam produced, and exhibit a stable initial ink ejection behavior owing to good ink flowability and good long-term storage stability.

While various embodiments have been presented to illustrate the invention, it will be apparent that other changes and modifications can be made without departing from the scope of the invention as defined in the appended claims.

What is claimed is:

1. An ink composition comprising:
   a cyclic silazane-based compound represented by Formula 1 below;
   a colorant; and
   a solvent:

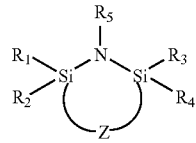

Formula 1 wherein, $R_1$ through $R_5$ are each independently hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ heteroalkoxy group, a substituted or unsubstituted $C_1$-$C_{20}$ alkylsulfonamide group, a substituted or unsubstituted $C_6$-$C_{20}$ arylsulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a carboxyl group or its salt, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroaryloxy group, a substituted or unsubstituted $C_6$-$C_{20}$ heteroarylalkenyl group, a substituted or unsubstituted $C_3$-$C_{20}$ cycloalkyl group, or a substituted or unsubstituted $C_3$-$C_{20}$ heterocycloalkyl group; and Z comprises a —($CH_2$)$_m$— group where m is an integer ranging from 1 to 10, and at least one methylene group is substituted by an oxygen, sulfur,

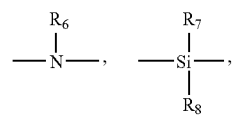

a substituted or unsubstituted $C_1$-$C_{10}$ alkylene group, a substituted or unsubstituted $C_1$-$C_{10}$ heteroalkylene group having 1-9 heteroatoms, or a substituted or unsubstituted $C_1$-$C_{10}$ alkenylene group where $R_6$, $R_7$, and $R_8$ are each independently hydrogen, a substituted or unsubstituted $C_1$-$C_{20}$ alkyl group, or a substituted or unsubstituted $C_2$-$C_{20}$ alkenyl group.

2. The ink composition of claim 1, wherein the cyclic silazane-based compound of Formula 1 is 2,2,4,4,6,6-hexamethyl-1,3,5,2,4,6-triazatrisilinane represented by Formula 2 below, 2,2,4,4,6,6,8,8-octamethyl-1,3,5,7,2,4,6,8-tetrazatetrasilocane represented by Formula 3 below, 1-(3-bromopropyl)-2,2,5,5-tetramethyl-1,2,5-azadisilolidine represented by Formula 4 below, 2,2,5,5-tetramethyl-1,2,5-azadisilolidine represented by Formula 5 below, 2,4,6-trimethyl-2,4,6-trivinyl-1,3,5,2,4,6-triazatrisilinane represented by Formula 6 below; 2,4,6,8-tetramethyl-2,4,6,8-tetravinyl-1,3,5,7,2,4,6,8-tetrazatetrasilocane represented by Formula 7 below, or a mixture thereof:

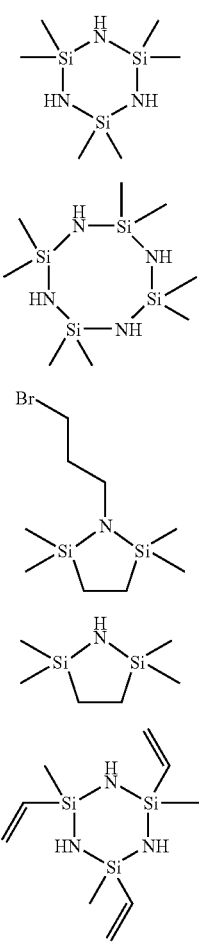

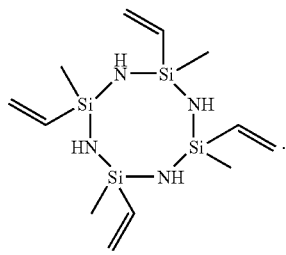

3. The ink composition of claim 1, wherein the content of the cyclic silazane-based compound of Formula 1 is about 0.01 to 10 parts by weight based on 100 parts by weight of the ink composition.

4. The ink composition of claim 1, wherein the content of the colorant is about 0.5 to 10 parts by weight based on 100 parts by weight of the ink composition.

5. The ink composition of claim 1, wherein the content of the solvent is about 80 to 99 parts by weight based on 100 parts by weight of the ink composition.

6. The ink composition of claim 1, wherein the solvent is an aqueous solvent, an organic solvent, or a mixture thereof.

7. The ink composition of claim 6, wherein the organic solvent is at least one selected from the group consisting of a monohydric alcohol-based solvent, a ketone-based solvent, an ester-based solvent, a polyhydric alcohol-based solvent, a nitrogen-containing solvent, and a sulfur-containing compound selected from dimethylsulfoxide, tetramethylsulfone, and thioglycol.

8. The ink composition of claim 6, wherein the solvent comprises about 100 parts by weight of the aqueous solvent and about 0.1 to 130 parts by weight of the organic solvent.

9. The ink composition of claim 1, further comprising an additive.

10. The ink composition of claim 9, wherein the additive is at least one selected from the group consisting of a wetting agent, a dispersant, a surfactant, a viscosity modifier, a pH adjustor, and an antioxidant.

11. The ink composition of claim 1, having a surface tension of about 15 to 70 dyne/cm at 20° C.

12. The ink composition of claim 1, having a viscosity of about 1 to 20 cps at 20° C.

13. An ink set comprising two or more kinds of the ink composition of claim 1.

14. A cartridge for an inkjet recording apparatus, comprising the ink set of claim 13.

15. An inkjet recording apparatus comprising the cartridge of claim 14.

* * * * *